United States Patent
Thomasma et al.

(10) Patent No.: US 11,556,329 B2
(45) Date of Patent: Jan. 17, 2023

(54) SYSTEM FOR UPDATING VEHICLE SOFTWARE

(71) Applicant: FORD GLOBAL TECHNOLOGIES, LLC, Dearborn, MI (US)

(72) Inventors: Timothy Thomasma, West Bloomfield, MI (US); Parvathy Viswamohan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/099,348

(22) Filed: Nov. 16, 2020

(65) Prior Publication Data

US 2022/0156054 A1 May 19, 2022

(51) Int. Cl.
  *G06F 8/65* (2018.01)
  *H04L 67/12* (2022.01)
  *H04L 67/00* (2022.01)

(52) U.S. Cl.
  CPC ............... *G06F 8/65* (2013.01); *H04L 67/12* (2013.01); *H04L 67/34* (2013.01)

(58) Field of Classification Search
  CPC ... G06F 8/65; G06F 8/658; G06F 8/60; G06F 8/71
  See application file for complete search history.

(56) References Cited

U.S. PATENT DOCUMENTS

| | | | |
|---|---|---|---|
| 7,366,589 B2 | 4/2008 | Habermas | |
| 7,665,081 B1 * | 2/2010 | Pavlyushchik | ......... G06F 8/658 717/168 |
| 2015/0193220 A1 * | 7/2015 | Rork | ...................... G06Q 10/20 717/170 |
| 2016/0294614 A1 * | 10/2016 | Searle | ...................... H04L 67/34 |
| 2016/0371076 A1 * | 12/2016 | Moeller | .................. G06F 8/654 |
| 2018/0095745 A1 | 4/2018 | Mine et al. | |
| 2018/0336024 A1 | 11/2018 | Klische | |
| 2019/0187971 A1 | 6/2019 | Wang et al. | |

* cited by examiner

*Primary Examiner* — Duy Khuong T Nguyen
(74) *Attorney, Agent, or Firm* — Gregory P. Brown; Brooks Kushman P.C.

(57) ABSTRACT

A server includes an interface configured to receive a new software content; a processor, configured to responsive to receiving the new software content, create a new rollout associated with the new software content, and identify a plurality of vehicles eligible to receive the new software content, responsive to detecting a first vehicle of the plurality of vehicles being yet to receive an existing software content associated with an existing rollout, generate a combined software content including both the new and existing software content, and associate the first vehicle with the combined software content.

15 Claims, 5 Drawing Sheets

SYSTEM FOR UPDATING VEHICLE SOFTWARE

TECHNICAL FIELD

The present disclosure generally relates to a system for updating vehicle software. More specifically, the present disclosure relates to a system for updating software customized to criteria of vehicles.

BACKGROUND

Modern vehicles are equipped with multiple controllers/computers to enable various configurable features such as infotainment, autonomous driving or the like. Software controlling those controllers may be updated periodically to provide the latest functionalities and security features. When new software update is available, a software rollout/deployment may be created to associate vehicles eligible to receive the update. The software may be sent to those eligible vehicles associated with the rollout.

SUMMARY

In one or more illustrative embodiments of the present disclosure, a server includes an interface configured to receive a new software content; a processor, configured to responsive to receiving the new software content, create a new rollout associated with the new software content, and identify a plurality of vehicles eligible to receive the new software content, responsive to detecting a first vehicle of the plurality of vehicles being yet to receive an existing software content associated with an existing rollout, generate a combined software content including both the new and existing software content, and associate the first vehicle with the combined software content.

In one or more illustrative embodiments of the present disclosure, a method for a server includes responsive to receiving the new software content via an interface, creating a new rollout associated with the new software content, and identifying a plurality of vehicles eligible to receive the new software content; creating a new rollout list in which each of the vehicles eligible to receive the new software content is associated with the new software content; and responsive to detecting a first vehicle of the plurality of vehicles having an outstanding existing software content associated with an existing rollout, generating a combined software content including both the new and existing software content, and updating the new rollout list such that the first vehicle is associated with the combined software content.

In one or more illustrative embodiments of the present disclosure, a computer device includes an interface configured to receive a first software content; a processor, configured to responsive to receiving the first software content via the interface, create a first rollout associated with the first software content, and identify a plurality of vehicles eligible to receive the first software content, create a first rollout list in which each of the vehicles eligible to receive the first software content is associated with the first software content, responsive to detecting a first vehicle of the plurality of vehicles being eligible but yet to receive a second software content associated with an second rollout, generate a combined software content including both the first and second software content, and update the first rollout list such that the first vehicle is associated with the combined software content in the first rollout list.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure proposes a vehicle software update rollout mechanism. More specifically, the present disclosure proposes a system and method for deploying software update data when multiple rollouts are available.

Figure 1:
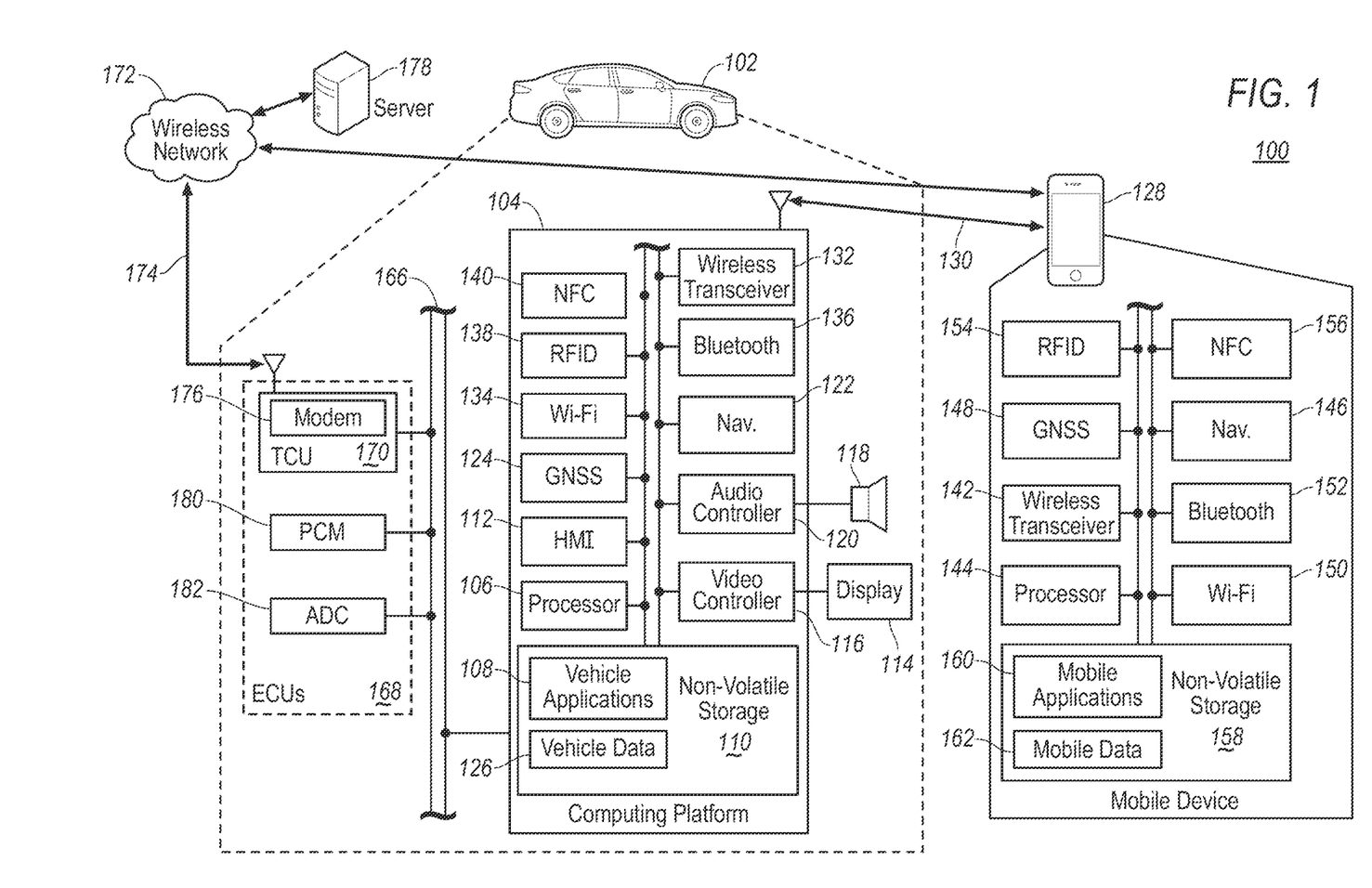
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, remote controls, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from HMI controls 112 configured to provide for occupant interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smart fobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, a ultra-wide band (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via Bluetooth low-energy (BLE), Wi-Fi, UWB, or the like.

The computing platform 104 may be configured to communicate with various ECUs 168 of the vehicle 102 configured to perform various operations. For instance, the computing platform 104 may be configured to communicate with a TCU 170 configured to control telecommunication between vehicle 102 and a wireless network 172 through a wireless connection 174 using a modem 176. The wireless connection 174 may be in the form of various communication network e.g., a cellular network. Through the wireless network 172, the vehicle may access one or more servers 178 to access various content for various purposes. It is noted that the terms wireless network and server are used as general terms in the present disclosure and may include any computing network involving carriers, router, computers, controllers or the like configured to store data and perform data processing functions and facilitate communication between various entities. The ECUs 168 may further include a powertrain control module (PCM) 180 configured to provide operate powertrain of the vehicle 102. The ECU 168 may further include an autonomous driving controller (ADC) 190 configured to provide autonomous driving features to the vehicle 102. The ADC 190 may be provided with a local storage to store software to enable the autonomous driving features. Additionally or alternatively, the ADC 190 may fully or partially rely on software (e.g. vehicle applications 108) from the vehicle storage 110 to enable to autonomous driving. The ADC 190 and/or computing platform 104 may be configured to update the software by downloading an update content data from the server 178 via the TCU 170 through the wireless network 172. Alternatively, the update content data may be download via a localized wireless network (e.g. a Wi-Fi access point) via the wireless transceiver 132. Alternatively, the update content data may be download via the mobile device 128.

Figure 2:
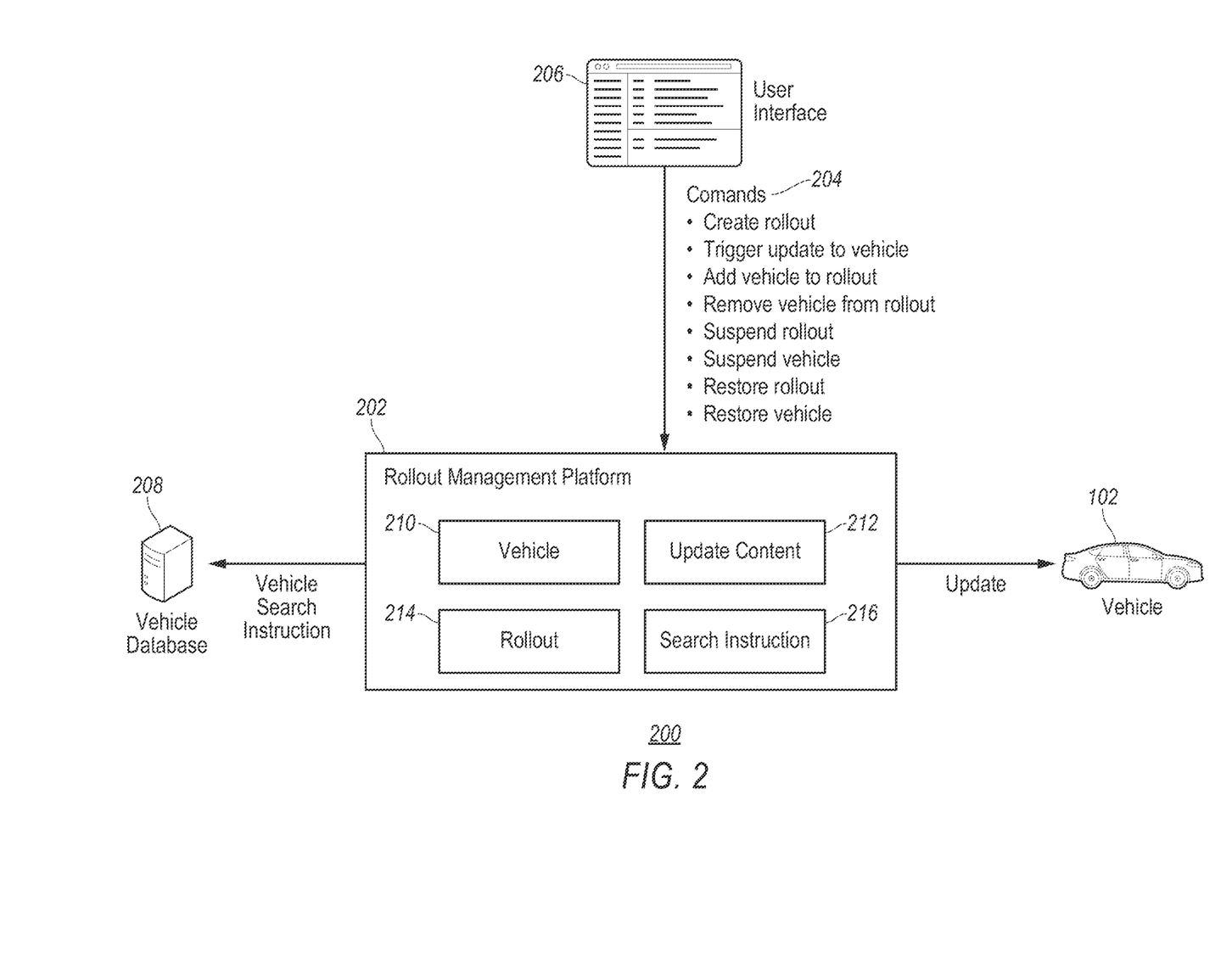
FIG. 2 illustrates an example block diagram of a vehicle software rollout system of one embodiment of the present disclosure.

Referring to FIG. 2, a diagram for vehicle software rollout system 200 of one embodiment of the present disclosure is illustrated. With continuing reference to FIG. 1, the rollout system 200 may include a rollout management platform 202 configured to manage and coordinate the vehicle software rollout/deployment to each vehicle 102. The rollout management platform 202 may be implemented via one or more servers 178 connected to the vehicles 102 via the wireless network 172 or a wired network (not shown). The rollout management platform 202 may be configured to receive commands 204 from a user interface 206 which may be operated by various parties. For instance, the user interface 206 may be operated by a vehicle manufacturer that provides vehicle update data periodically. Responsive to a new update, the manufacturer may send commands to the rollout management platform 202 via the user interface 206 to prepare for software deployment to each eligible vehicle. The commands 204 may include instructions to trigger various operations. For instance, the commands 204 may include instructions to create rollout, trigger update to vehicle, add/remove one or more vehicles to rollout, suspend/restore one or more rollouts, and/or suspend/restore one or more vehicles. The rollout management platform 202 may be further in communication with a vehicle database 208 configured to record vehicle information such as vehicle software information. The vehicle database 208 may be remotely located from the rollout management platform 202. Alternatively, the vehicle database 208 may be local to or integrated with the rollout management platform 202. The rollout management platform 202 individually or in combination with the vehicle database 208 may record various entries of data. For instance, the rollout management platform 202 may record a vehicle entry 210 reflecting vehicle identification and software information, an update content entry 212 recording software update content received from the user interface 206, a software rollout/deployment entry 214 reflecting rollout status corresponding to update contents, and a search entry including various search instruction 216 to facilitating identification of corresponding rollouts for each vehicle. The rollout management platform 202 may be further configured to send the vehicle update content to each corresponding vehicle 102 (to be discussed in detail below).

Figure 3:
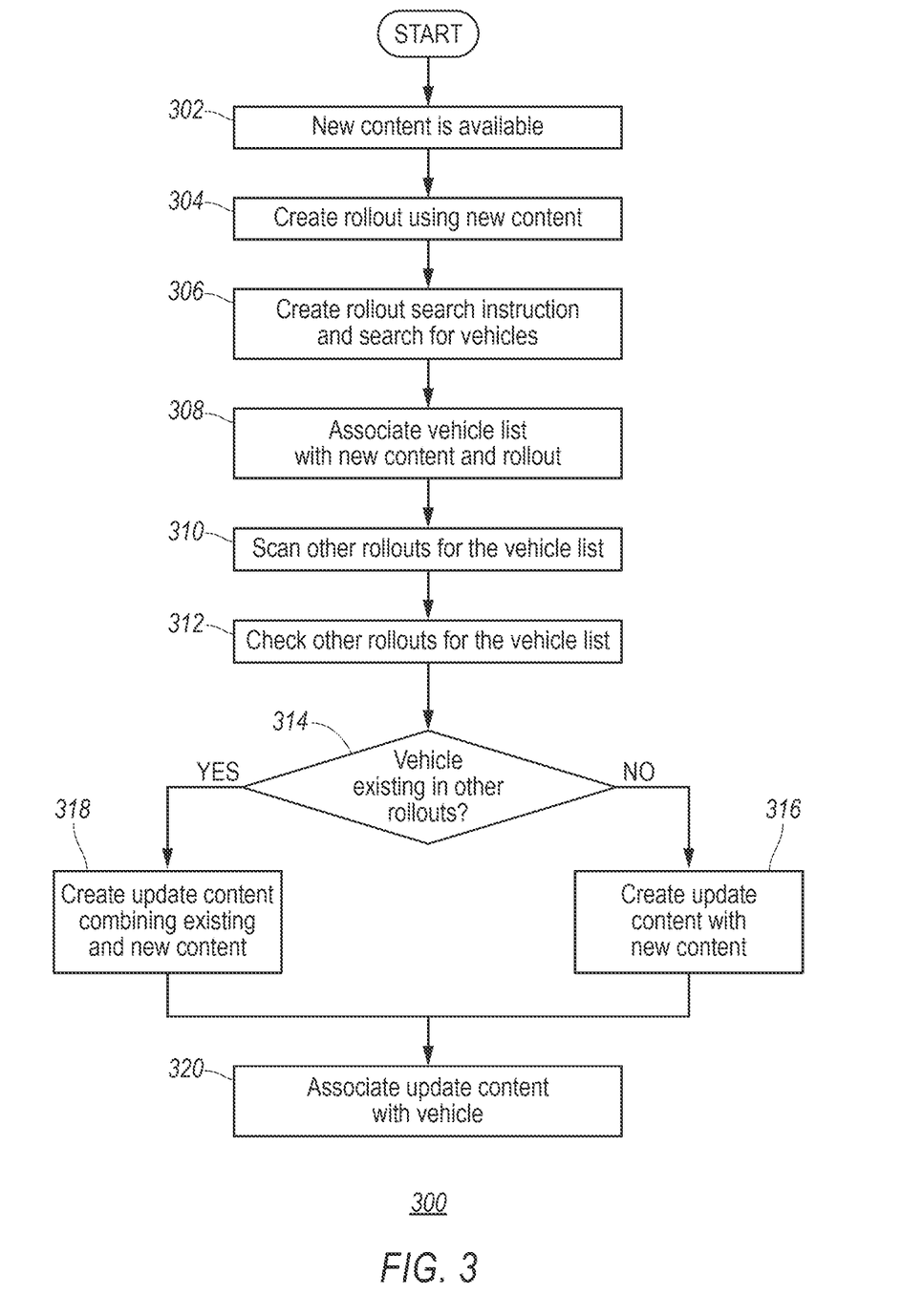
FIG. 3 illustrates an example flow diagram of a process for creating an update content of one embodiment of the present disclosure.

Referring to FIG. 3, a flow diagram of a process 300 for creating an update content of one embodiment of the present disclosure is illustrated. With continuing reference to FIGS. 1 and 2, the process 300 may be implemented via the rollout management platform 202 illustrated in FIG. 2. At operation 302, the rollout management platform 202 receives a new vehicle software content made available via the user interface 206. In response, the rollout management platform 202 creates a software rollout using the new content at operation 304. At operation 306, the rollout management platform 202 generates rollout search instruction 216 to identify vehicles that are eligible for the newly created rollout. The rollout management platform 202 may generate the search instruction 216 using identifiers which identifies compatible hardware (e.g. ECUs) included in the new content and searches for vehicles provided with the compatible hardware using the vehicle database 208. With the eligible vehicles identified, at operation 308, the rollout management platform 202 associates the new content and rollout with the vehicle list.

At operation 310, the rollout management platform 202 scans for other active software rollouts and at operation 312, checks if any vehicles identified in the vehicle list is associated with any of the identified active rollout that is yet to be performed. If the answer is a no, the process proceeds to operation 316 and the rollout management platform 202 creates an update content using the new content only. Otherwise, if the rollout management platform 202 detects one or more vehicles on the vehicle list are associated with one or more existing rollouts that are outstanding, the process proceeds to operation 318 and the rollout management platform 202 creates the update content by combining the content associated with the outstanding rollout with the new content. At operation 320, the rollout management platform 202 associate the update content with each vehicle to prepared for the update.

Figure 4A:
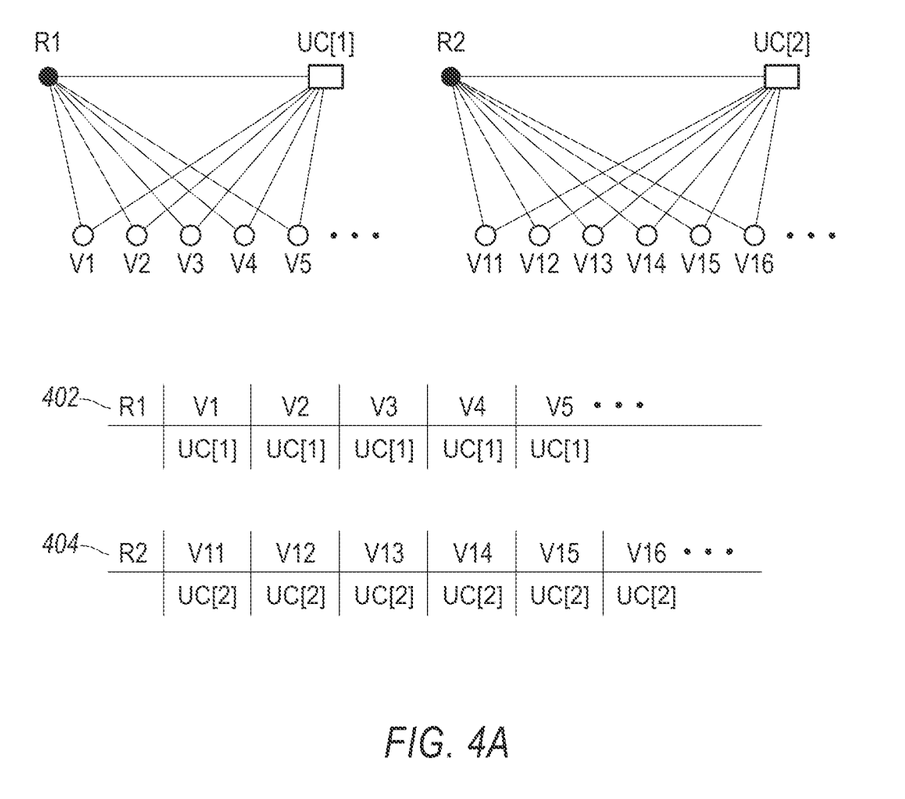
FIGS. 4A and 4B illustrate schematic diagrams of a vehicle software rollout example of one embodiment of the present disclosure.
Figure 4B:
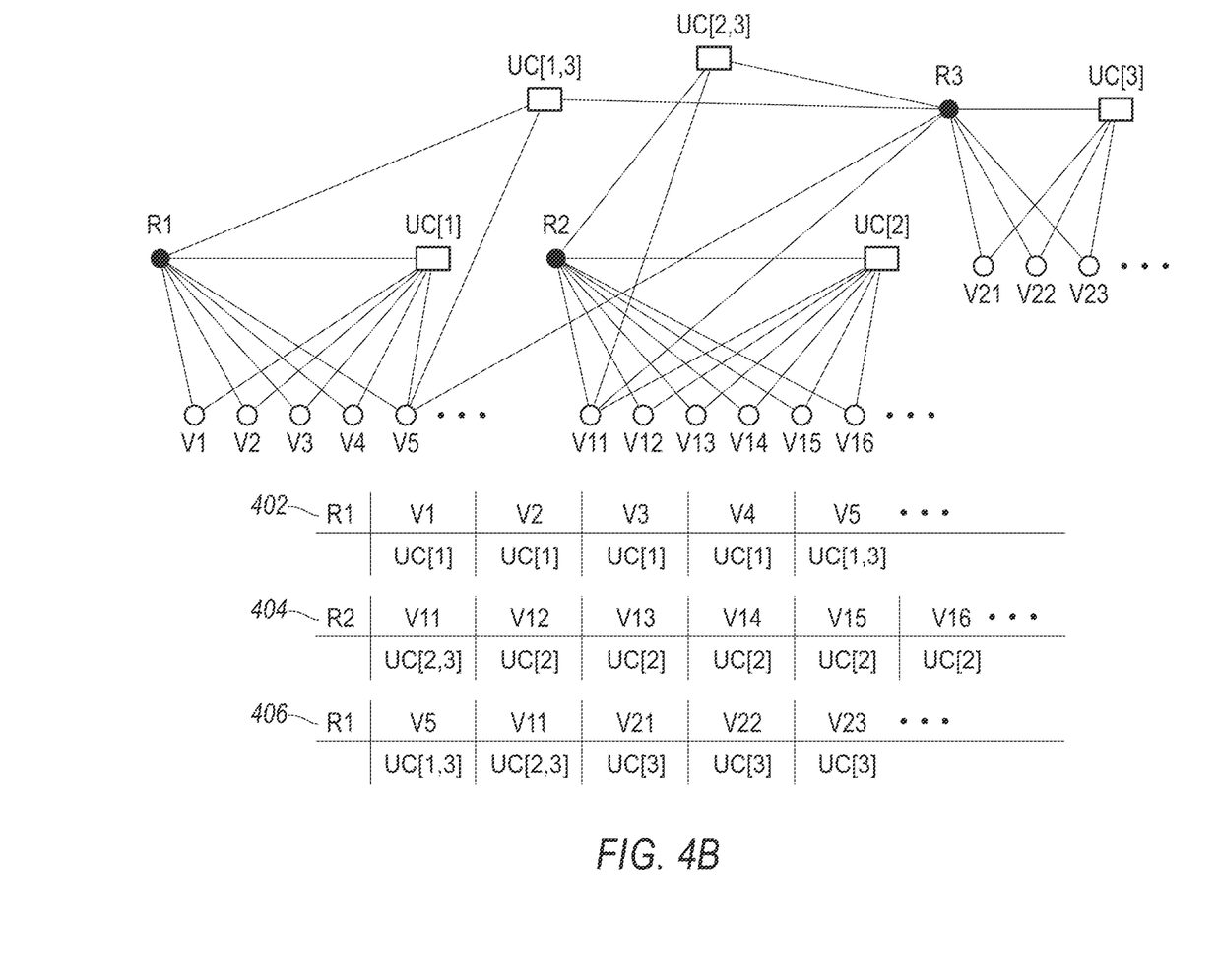

The operations of process 300 may be applied to various situations. Referring to FIGS. 4A and 4B, schematic diagrams of a vehicle software update rollout process are illustrated. As illustrated in FIG. 4A, a first vehicle software rollout R1 may be associated with a first vehicle software update content UC[1]. There may be multiple vehicles (i.e. V1 to V5, and etc.) associated with the first rollout R1 and first update content UC[1]. A second vehicle software rollout R2 may be associated with a second vehicle software update content UC[2]. There may multiple vehicles (i.e. V11 to V16, and etc.) associated with the second rollout R2 and second update content UC[2]. The association of each vehicle and the update content is illustrated in rollout association tables (a.k.a. rollout list) 402 and 404 for the first and second rollout R1 and R2 respectively. The association tables 402 and 404 may be created and stored in the rollout management platform 202 and/or the vehicle database 208 as an example. In the present example illustrated with reference to FIG. 4A, there is no cross-relationship between the first rollout R1 and the second rollout R2. In other words, no vehicle listed in either table is eligible for both of the first and second update contents UC[1] and UC[2]. In other words, vehicles V1-V5 listed in the association table 402 are all associated with the first rollout R1, but none of the vehicles V1-V5 are associate with the second rollout R2. The reverse is true for vehicles listed in the association table 404.

Referring to FIG. 4B, a third rollout R3 associated with the third update content UC[3] may become available in addition to the first rollout R1 and the second rollout R2. The rollout management platform 202 may determine that one or more vehicles associated with the first rollout R1 and the second rollout R2 are eligible for the third update content UC[3]. In the present example, the rollout management platform 202 may determine that the vehicle V5 associated with the first rollout R1 and the vehicle V11 associated with the second rollout R2 are eligible to receive the third update content UC[3] whereas the vehicles V5 and V11 are yet to receive their respective first and second update content UC[1] and UC[2]. In response, the rollout management platform 202 may create a first combined update content UC[1,3] including the first and third update content UC[1] and UC[3] and associate the vehicle V5 with the first combined update content UC[1,3]. The rollout management platform 202 may further create a second combined update content UC[2,3] including the second and third update content UC[2] and UC[3] and associate the vehicle V11 with the first combined update content UC[2,3]. The rollout management platform 202 may further update the association tables 402 and 404 for the first and second rollouts R1 and R2 using the first combined update content UC[1,3] for the vehicle V5 and the second combined update content UC[2,3] for the vehicle V11. Additionally, the vehicles V5 and V11 may be put into the association table 406 for the third rollout R3.

The association tables may be updated periodically. As an example, the rollout management platform 202 may remove/disassociate a vehicle from the association tables responsive to verifying such a vehicle has received the update content and/or successfully performed the software update. Taking the vehicle V5 illustrated in FIG. 4B for example, responsive to verifying the vehicle V5 has received the first update content UC[1] but yet to receive the third update content UC[3], the rollout management platform 202 may remove the vehicle V5 from the association table 402 for the first rollout R1, and update the association table 406 for the third rollout R3 such that the vehicle V5 is now only associated with the third update content UC[3]. This situation may occur when the vehicle user is provided with options to select which update content he/she may wish to receive. The user may choose the receive the combined update content, or alternatively, an individual update content. Otherwise, if the vehicle V5 has received the combined update content UC[1, 3], the rollout management platform 202 may remove the vehicle V5 from both the association tables 402 and 406 for the both the first and third rollouts R1 and R3. Additionally, the rollout management platform 202 may manually add or remove vehicles from the association tables based on the commands 204 received from the interface 206.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A server, comprising:
    an interface configured to receive a new software content;
    a processor, configured to
        responsive to receiving the new software content, create a new rollout associated with the new software content, and identify a plurality of vehicles eligible to receive the new software content,
        responsive to detecting a first vehicle of the plurality of vehicles being yet to receive an existing software content associated with an existing rollout, generate a combined software separated from the existing and new software content by combining the new software content with the existing software content,
        associate the first vehicle with the combined software content to allow the first vehicle to update to a new status corresponding to the new software content without going through a prior status corresponding to the existing software content,
        create a new rollout list in which each of the vehicles eligible to receive the new software content is associated with the new software content, and
        responsive to receiving a manual add vehicle command via the interface, add a second vehicle to the new rollout list, wherein the second vehicle is not within the vehicles eligible to receive the new software content identified by the server.

2. The server of claim 1, wherein the processor is further configured to: responsive to detecting the first vehicle being yet to receive the existing software content, update the new rollout list such that the first vehicle is associated with the combined software content in the new rollout list.

3. The server of claim 2, wherein the processor is further configured to:
    responsive to detecting the first vehicle being yet to receive the existing software content, update an existing rollout list such that the first vehicle is associated with the combined software content in the existing rollout list.

4. The server of claim 3, wherein the processor is further configured to:
    responsive to verifying the first vehicle has received the combined software content, remove the first vehicle from both the existing rollout list and the new rollout list.

5. The server of claim 3, wherein the processor is further configured to:
    responsive to verifying the first vehicle has received the existing software content and failed to receive the new software content, remove the first vehicle from the existing rollout list and update the new rollout list such that the first vehicle is no longer associated with the existing software content.

6. The server of claim 1, wherein the new software content includes a software identifier, the processor is further configured to:
    generate a search instruction to identify the vehicles eligible to receive the new software content using the identifier via a vehicle database located remotely from the server.

7. The server of claim 1, wherein the processor is further configured to:
    disassociate the first vehicle from the existing software content and new software content individually.

8. A method for a server, comprising:
    responsive to receiving the new software content via an interface, creating a new rollout associated with the new software content, wherein the new software content includes a software identifier;
    generating a search instruction to search for the vehicles eligible to receive the new software content using the identifier via a vehicle database located remotely from the server;
    associates a plurality of vehicles eligible to receive the new software content;
    creating a new rollout list in which each of the vehicles eligible to receive the new software content is associated with the new software content;
    responsive to detecting a first vehicle of the plurality of vehicles having an outstanding existing software content associated with an existing rollout, combining the new and existing software content to generate a combined software content, and updating the new rollout list such that the first vehicle is associated with the combined software content;
    send the combined software content to the first vehicle such that first vehicle directly updates to a new version corresponding to the new software content without requiring the first vehicle to update to an existing version corresponding to the existing software content and
    responsive to receiving a manual add vehicle command via the interface, adding a second vehicle to the new rollout list.

9. The method of claim 8, further comprising:
updating an existing rollout list such that the first vehicle is associated with the combined software content in the existing rollout list.

10. The method of claim 9, further comprising:
responsive to verifying the first vehicle has received the combined software content, disassociating the first vehicle from both the existing rollout list and the new rollout list.

11. The method of claim 9, further comprising:
responsive to verifying the first vehicle has received the new software content and failed to receive the existing software content, disassociating the first vehicle from the new rollout list and updating the existing rollout list such that the first vehicle is no longer associated with the new software content.

12. A computer device, comprising:
an interface configured to receive a first software content;
a processor, configured to
responsive to receiving the first software content via the interface, create a first rollout associated with the first software content, and identify a plurality of vehicles eligible to receive the first software content,
create a first rollout list in which each of the vehicles eligible to receive the first software content is associated with the first software content,
responsive to detecting a first vehicle of the plurality of vehicles being eligible but yet to receive a second software content associated with a second rollout, generate a combined software content including both the first and second software content, and update the first rollout list such that the first vehicle is associated with the combined software content in the first rollout list and disassociated with the first software content and the second software content individually,
update a second rollout list such that the first vehicle is associated with the combined software content in the second rollout list, and
responsive to receiving a manual add vehicle command via the interface, adding a second vehicle to the second rollout list.

13. The computer device of claim 12, wherein the processor is further configured to: responsive to verifying the first vehicle has received the combined software content, remove the first vehicle from both the first and second rollout lists.

14. The computer device of claim 12, wherein the processor is further configured to: responsive to verifying the first vehicle has received the first software content and failed to receive the second software content, remove the first vehicle from the first rollout list and update the second rollout list such that the first vehicle is no longer associated with the first software content.

15. The computer device of claim 12, wherein the processor is further configured to: generate a search instruction to search for the vehicles eligible to receive the first software content via a vehicle database located remotely from the computer device.

* * * * *